US012650331B2

(12) United States Patent
Dowling et al.

(10) Patent No.: US 12,650,331 B2
(45) Date of Patent: Jun. 9, 2026

(54) SYSTEM AND METHOD FOR CALIBRATING PROCESS TO COMPUTE WEIGHT OF MATERIAL IN DUMP BODIES

(71) Applicant: Caterpillar Inc., Peoria, IL (US)

(72) Inventors: Alexander Eli Dowling, Mount Hicks (AU); Steven Edward Johnson, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 565 days.

(21) Appl. No.: 18/127,208

(22) Filed: Mar. 28, 2023

(65) Prior Publication Data

US 2023/0324215 A1     Oct. 12, 2023

(30) Foreign Application Priority Data

Apr. 11, 2022    (AU) ................................. 2022202397

(51) Int. Cl.
*G01G 23/01* (2006.01)
*B60P 1/16* (2006.01)
*G01G 19/12* (2006.01)

(52) U.S. Cl.
CPC ............. *G01G 23/01* (2013.01); *G01G 19/12* (2013.01); *B60P 1/16* (2013.01)

(58) Field of Classification Search
CPC ............ G01G 19/12; G01G 23/01; B60P 1/16
See application file for complete search history.

(56) References Cited

U.S. PATENT DOCUMENTS

| | | | |
|---|---|---|---|
| 5,509,293 | A | 4/1996 | Karumanchi |
| 6,858,809 | B2 | 2/2005 | Bender |
| 9,695,571 | B1 | 7/2017 | Ge et al. |
| 9,841,312 | B2 | 12/2017 | Vall et al. |
| 10,024,710 | B2 * | 7/2018 | Talmaki ............... G01G 19/083 |
| 10,401,249 | B2 | 9/2019 | Steinlage et al. |
| 2021/0062651 | A1 | 3/2021 | Laine |
| 2021/0123792 | A1 | 4/2021 | Sherlock |

FOREIGN PATENT DOCUMENTS

| | | |
|---|---|---|
| EP | 1801551 A2 | 6/2007 |
| GB | 2367370 B | 2/2004 |
| WO | 2014201131 A1 | 12/2014 |

* cited by examiner

*Primary Examiner* — An H Do

(57) ABSTRACT

A method for calibrating a process by which a weight of a material in a dump body of a machine is computed. The method includes acquiring first values correspondingly from one or more strain sensors in an unladen state of the dump body; activating an actuator to push the dump body against the strain sensors to simulate one or more forces exertable by one or more payloads in a laden state of the dump body; and acquiring second values correspondingly from the strain sensors when the actuator is activated to simulate the forces. Further, the method includes using the first values and the second values to calibrate the process.

20 Claims, 5 Drawing Sheets

SYSTEM AND METHOD FOR CALIBRATING PROCESS TO COMPUTE WEIGHT OF MATERIAL IN DUMP BODIES

CROSS-REFERENCE TO RELATED APPLICATION

This application claims priority under 35 USC § 119 and the Paris Convention to Australian Patent Application 2022202397 filed on Apr. 11, 2022.

TECHNICAL FIELD

The present disclosure relates to weighing of a material held in a dump body of a machine. More particularly, the present disclosure relates to a system and a method for calibrating a process to compute the weight of a material in a dump body.

BACKGROUND

Machines, such as mining trucks, articulated trucks, etc., generally include a dump body into which a variety of material, such as rocks, ores, soil, dirt, debris, disintegrated particles, minerals, etc., are received as a payload. Once the material is received into the dump body, the material may be hauled or transferred by the machine to a site, such as a dump site, where the material may be unloaded and/or released from the dump body.

To determine worksite productivity, it is often required that an amount or a weight of material, which is transferred, be computed. In this regard, weighing systems are commonly used in such machines to weigh the material in the dump body. Weighing system generally include sensors (e.g., strain sensors) that may detect values (e.g., strain values or voltages) corresponding to a receipt of load into the dump body, and based on which a weight of the material may be computed. Due to several factors, such as modifications to the machine or to the dump body by an end customer, damage to the machine or to the dump body, harshness of a terrain of the worksite, and/or the like, values or readings suppliable by said sensors and the consequent process by which the weight of the load may be computed by the weighing system may be affected.

U.S. Pat. No. 5,509,293 relates to a method for measuring and indicating payload weight for a machine having a lift cylinder for elevating a payload carrier. The method includes lifting a load of known mass during calibrating and sensing a calibration lift cylinder velocity during calibration. To determine payload, lift cylinder hydraulic pressure and lift cylinder extension are sensed during a lifting operation of the machine. A first estimate of the payload is determined as a function of the lift cylinder hydraulic pressure and extension. The method includes determining an operating lift cylinder velocity during the lifting operation and determining a velocity correction factor as a function of the calibration lift cylinder velocity and the operating lift cylinder velocity. A second estimate of the payload is calculated as a function of the first estimate and the velocity correction factor.

SUMMARY OF THE INVENTION

In one aspect, the disclosure relates to a method for calibrating a process by which a weight of a material in a dump body of a machine is computed. The method includes acquiring, by a controller, first values correspondingly from one or more strain sensors in an unladen state of the dump body; activating, by the controller, an actuator to push the dump body against the strain sensors to simulate one or more forces exertable by one or more payloads in a laden state of the dump body; and acquiring, by the controller, second values correspondingly from the strain sensors when the actuator is activated to simulate the forces. Further, the method includes using, by the controller, the first values and the second values to calibrate the process.

In another aspect, the disclosure is directed to a system for calibrating a process by which a weight of a material in a dump body of a machine is computed. The system includes a memory for storing one or more sets of instruction and a controller communicably coupled to the memory and configured to execute the one or more sets of instruction to acquire first values correspondingly from one or more strain sensors in an unladen state of the dump body, activate an actuator to push the dump body against the strain sensors to simulate one or more forces exertable by one or more payloads in a laden state of the dump body, and acquire second values correspondingly from the strain sensors when the actuator is activated to simulate the forces. The controller is further configured to use the first values and the second values to calibrate the process.

In yet another aspect, the disclosure relates to a machine. The machine includes a frame, a dump body, an actuator, one or more strain sensors, and a system for calibrating a process by which the weight of the material in the dump body is computed. The dump body is configured to receive a material. The actuator is coupled between the frame and the dump body. The strain sensors are configured to acquire positions between the dump body and the frame to detect a weight of the material. The system includes a memory for storing one or more sets of instruction and a controller. The controller is communicably coupled to the strain sensors and to the memory and is configured to execute the one or more sets of instruction to acquire first values correspondingly from the strain sensors in an unladen state of the dump body, activate the actuator to push the dump body against the strain sensors to simulate one or more forces exertable by one or more payloads in a laden state of the dump body, and acquire second values correspondingly from the strain sensors when the actuator is activated to simulate the forces. Further, the controller is configured to use the first values and the second values to calibrate the process.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
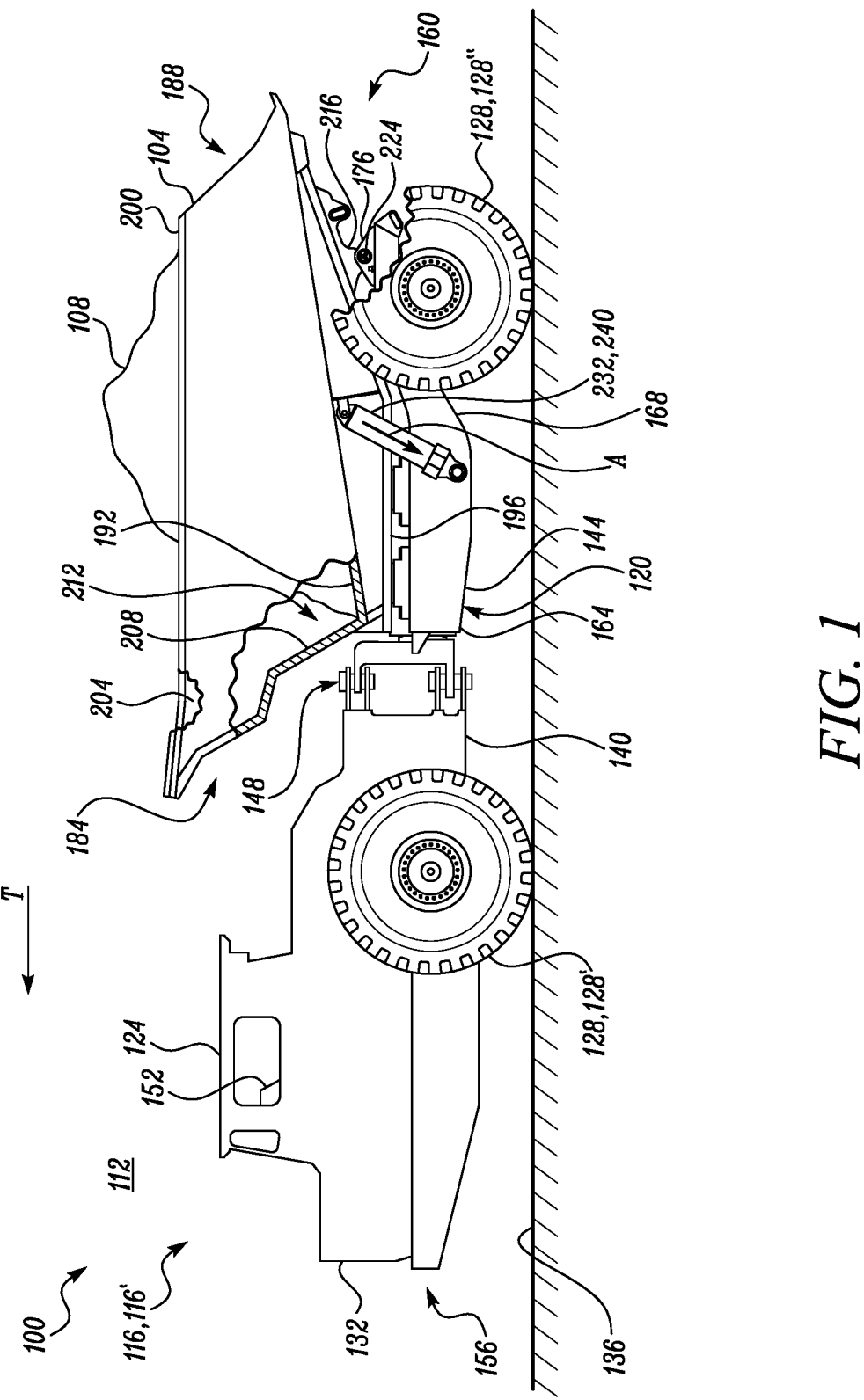
FIG. 1 is a side view of an exemplary machine that includes a dump body, in accordance with an embodiment of the present disclosure.
Figure 2:
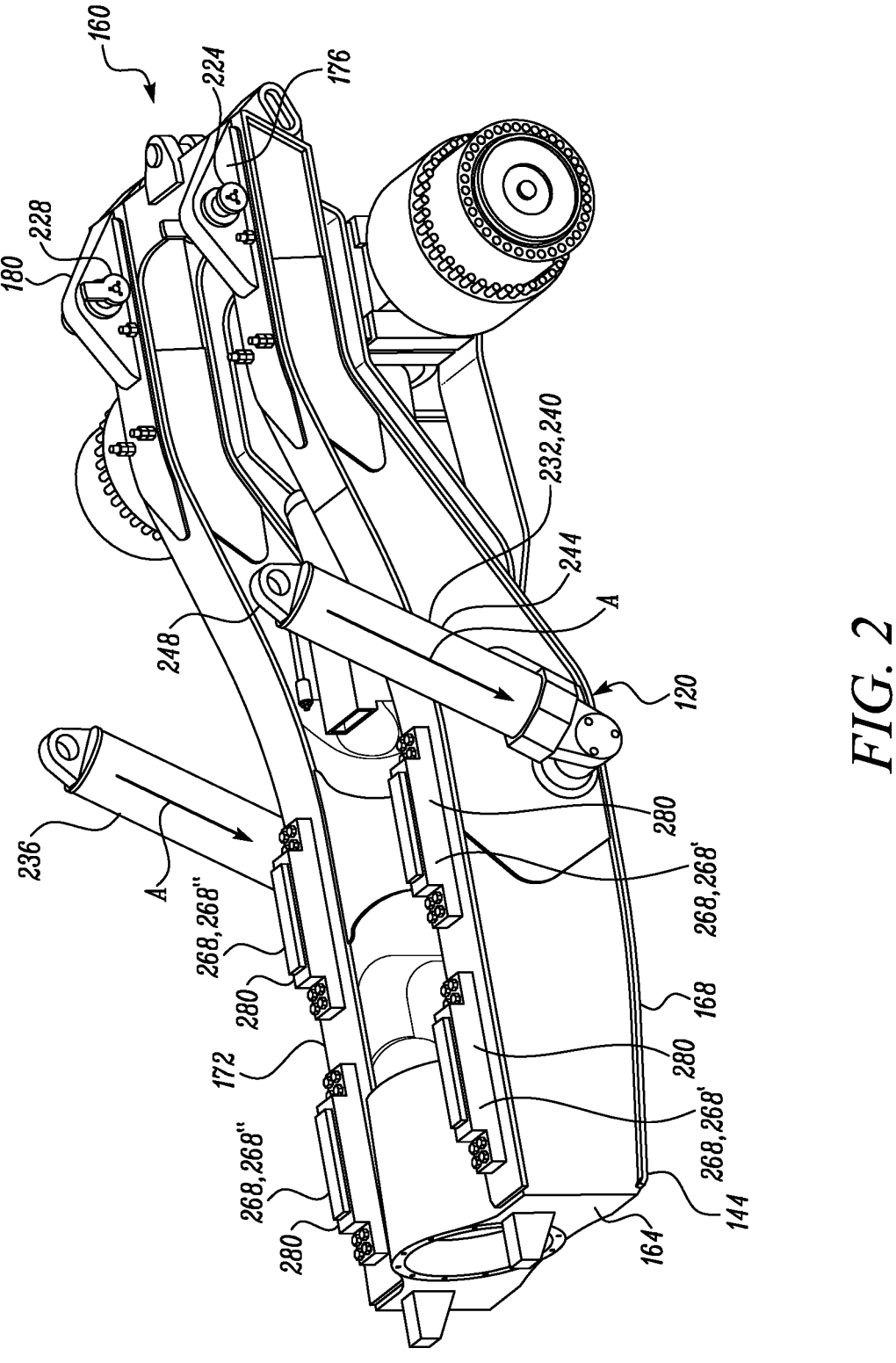
FIG. 2 is a perspective view of a frame of the machine of FIG. 1 that includes actuators to move the dump body relative to the frame, in accordance with various embodiments of the present disclosure.

Referring to FIGS. 1 and 2, an exemplary haul machine 100 is shown. The haul machine 100 may be one having a dump body 104 within which a payload (e.g., a material 108, such as ores and minerals) may be received for transferring or hauling the material 108 from one location to another at a worksite 112. The haul machine 100 may include a dump truck 116, such as an articulated dump truck 116'. Locations of the worksite 112 between which the haul machine 100 may traverse back and forth may include load locations (not shown) from where the haul machine 100 (i.e., the dump body 104 of the haul machine 100) may receive the material 108, and dump locations (not shown) up to where the haul machine 100 may traverse to so as to dump or release the material 108 from the dump body 104. Examples of the worksite 112 may include a construction site, a mine site, a landfill, a quarry, an underground mine site, and the like.

Aspects of the present disclosure may be applied to other machines having dump bodies. For example, the haul machine 100 may include or may be representative of any mobile machine or a construction machine having the dump body. Aspects of the present disclosure also may be applicable to mining trucks, off-highway trucks, pick-up trucks, and similar machines. The haul machine 100 may include a frame 120, an operator cab 124, and one or more traction devices 128. The haul machine 100 may also include several other parts and sub-systems, such as a power compartment 132 that may house a power source (e.g., an internal combustion engine) (not shown) for powering various functions of the haul machine 100, including, but not limited to, propelling the haul machine 100 over a ground surface 136 of the worksite 112. For convenience, the haul machine 100 may be hereinafter referred to as a machine 100.

The frame 120 may include a rigid structure to which nearly every other component (and/or sub-component) of the machine 100 may be coupled to. If the machine 100 were to include an articulated machine, such as the articulated dump truck 116', as exemplarily shown in FIG. 1, it may be contemplated that the frame 120 may include a split frame configuration defining a forward sub-frame portion 140 and a rearward sub-frame portion 144. The forward sub-frame portion 140 may be pivotably coupled to the rearward sub-frame portion 144 by a hitch assembly 148 at a hitch location (as visualized in FIG. 1). By way of the hitch assembly 148, the forward sub-frame portion 140 may pivot or articulate relative to the rearward sub-frame portion 144, during machine movement, to steer the machine 100.

As an example, the forward sub-frame portion 140 may support the operator cab 124 that, apart from housing various parts and systems, such as controls, etc., of the machine 100, may also accommodate/station one or more operators (not shown) of the machine 100 for the control of the many functions of the machine 100. The operator cab 124 may include an operator interface or an input/output device 152 (see also FIG. 3), including one or more of a display unit, a speaker unit, a lever, a control panel, a touchscreen, a joystick, and/or the like, that may be accessed by one or more operators of the machine 100 so as to feed certain input and/or monitor one or more aspects related to a functioning of the machine 100. Optionally, the input/output device 152 may be situated remotely to the machine 100. Apart from the operator cab 124, the forward sub-frame portion 140 may also support the power compartment 132 housing the power source (e.g., the internal combustion engine). Additionally, the forward sub-frame portion 140 may define a forward end 156 of the machine 100.

Referring to FIGS. 1 and 2, the rearward sub-frame portion 144 may support the dump body 104 of the machine 100. For example, the rearward sub-frame portion 144 may define a rearward end 160 of the machine 100. The rearward sub-frame portion 144 may also define a cab facing end 164, opposite to the rearward end 160. The rearward sub-frame portion 144 may be pivotably coupled to the forward sub-frame portion 140 by way of the hitch assembly 148 at the cab facing end 164. Although not limited, the rearward sub-frame portion 144 may include a configuration similar to that of a ladder frame layout. As an example, the rearward sub-frame portion 144 may include a first arm 168 and a second arm 172. The first arm 168 and the second arm 172 may be structurally similar to each other, may be parallelly disposed with respect to each other, and may be coupled to each other. As an example, both the first arm 168 and the second arm 172 may be symmetrically laid out with respect to each other about a rearward longitudinal axis (not shown) that may pass centrally through the rearward sub-frame portion 144.

It may be noted that the terms 'forward' and 'rearward', as used herein, are in relation to an exemplary direction of travel of the machine 100, as represented by arrow, T, in FIG. 1, in which the machine 100 may generally travel so as to move or shuttle between the load location and the dump location. Said direction of travel is exemplarily defined from the rearward end 160 towards the forward end 156. During a straight line travel of the machine, the forward sub-frame portion 140 may be aligned (i.e., to be in line) with respect to the rearward sub-frame portion 144. However, during a movement of the machine 100 either towards a left of the machine 100 or towards a right of the machine 100, the forward sub-frame portion 140 may articulate or be tilted relative to the rearward sub-frame portion 144. Also, the terms 'left' and 'right' as used in the disclosure may be understood when viewing the machine 100 from the rearward end 160 towards the forward end 156.

Further, the rearward end 160 of the rearward sub-frame portion 144 of the frame 120 may include a set of engagement structures, e.g., a pair of engagement structures, explicitly referred to as a first engagement structure 176 and a second engagement structure 180. The first engagement structure 176 may be arranged on the first arm 168 at the rearward end 160, while the second engagement structure 180 may be arranged on the second arm 172 at the rearward end 160. In some embodiments, the first engagement structure 176 and the second engagement structure 180 may be fixedly coupled (e.g., by welding) to the first arm 168 and the second arm 172, respectively.

The traction devices 128 may be operably coupled to the frame 120 and may movably support the frame 120 (i.e., the forward sub-frame portion 140 and the rearward sub-frame portion 144) above the ground surface 136, and may facilitate the movement of the machine 100 over the ground surface 136. For example, the traction devices 128 may be configured to receive power from the power source for propelling the frame 120 (and thus the machine 100) over the ground surface 136, thereby facilitating the machine's travel or movement along direction, T, through and across the expanse of the worksite 112. The traction devices 128 may include wheels, although other types of traction devices, such as endless tracks or crawler tracks, may be contemplated for employment either alone or in combination with the wheels. The traction devices 128 may include a pair of forward wheels 128' (operably coupled to the forward sub-frame portion 140) and a pair of rearward wheels 128" (operably coupled to the rearward sub-frame portion 144), as shown.

The dump body 104 may define a front end 184 and a rear end 188. The dump body 104 may include a floor 192 and an underside 196 defined under the floor 192. Further, the dump body 104 includes a pair of sidewalls (e.g., a first sidewall 200 and a second sidewall 204). As an example, the first sidewall 200 and the second sidewall 204 extend upright with respect to the floor 192. The first sidewall 200 and the second sidewall 204 may be laterally opposed to each other about the floor 192. For example, the first sidewall 200 may be defined at a left side of the dump body 104 and the second sidewall 204 may be defined at a right side of the dump body 104. The dump body 104 may be supported on the rearward sub-frame portion 144 of the frame 120 with the front end 184 directed towards the forward sub-frame portion 140. The dump body 104 may also include a front wall 208 extending between the first sidewall 200 and the second sidewall 204. Combinedly, the first sidewall 200, the second sidewall 204, the front wall 208, and the floor 192, may define a cavity 212 of the dump body 104 within which the material 108 may be received that is to be transferred.

The dump body 104 may be pivotably coupled to the frame 120 (or to the rearward sub-frame portion 144 of the frame 120). In this regard, the dump body 104 may include a pair of brackets (see first bracket 216 in FIG. 1) that may be correspondingly and pivotably coupled to the pair of engagement structures. A corresponding pin may pass through each assembly of an engagement structure and a bracket to enable the pivotable coupling therebetween, in turn enabling the pivotable coupling between the dump body 104 and the frame 120 (i.e., the rearward sub-frame portion 144 of the frame 120). For example, a first pin 224 may pass through the first engagement structure 176 and the first bracket 216 and a second pin 228 may pass through the second engagement structure 180 and a corresponding bracket (i.e., a second bracket) (not visible in the orientation of the machine 100 or in the view of the frame 120 in FIGS. 1 and 2). The second bracket may be similar to the first bracket 216.

The pivotable coupling between the dump body 104 and the frame 120 enables the dump body 104 to be moved between a seated position and a hoisted position relative to the frame 120. It may be noted that during a movement of the machine 100, the dump body 104 may acquire the seated position (i.e., a position in which the dump body 104 may be seated or resting on or atop the rearward sub-frame portion 144 of the frame 120, e.g., against the first arm 168 and second arm 172 of the rearward sub-frame portion 144 of the frame 120) (i.e., the position of the dump body 104 in FIG. 1), while when the machine 100 releases and/or dumps the material 108 at a dump location, the dump body 104 may acquire the hoisted position (i.e., a position in which the dump body 104 is pivoted or tilted about the first pin 224 and the second pin 228 such that any material (e.g., material 108) within the cavity 212 may flow out and be released from the dump body 104 under the action of gravity).

In one example, when the dump body 104 is tilted, the front end 184 may face upwards, away from the ground surface 136 and the rear end 188 may face downwards, towards the ground surface 136, and when the dump body 104 is seated, the front end 184 may be directed towards the forward sub-frame portion 140 of the machine 100 and the rear end 188 may face rearwards of the machine 100. Further, to effectuate the aforesaid tilt of the dump body 104, the machine 100 may include one or more actuators (e.g., see first actuator 232 and second actuator 236) (see FIG. 2) that may be coupled between the rearward sub-frame portion 144 and the dump body 104, and, in so doing, may be coupled between the frame and the dump body. The first actuator 232 may be provided at a left side of the frame 120 (or the rearward sub-frame portion 144 of the frame 120), while the second actuator 236 may be provided at a right side of the frame 120 (or the rearward sub-frame portion 144 of the frame 120). The forthcoming description mostly includes references to the first actuator 232. A working of the second actuator 236 may be similar to a working of the first actuator 232, and therefore, discussions corresponding to the first actuator 232 may be suitably applicable to the second actuator 236, as well. For convenience, the first actuator 232 may be simply referred to as an 'actuator 232'.

Figure 3:
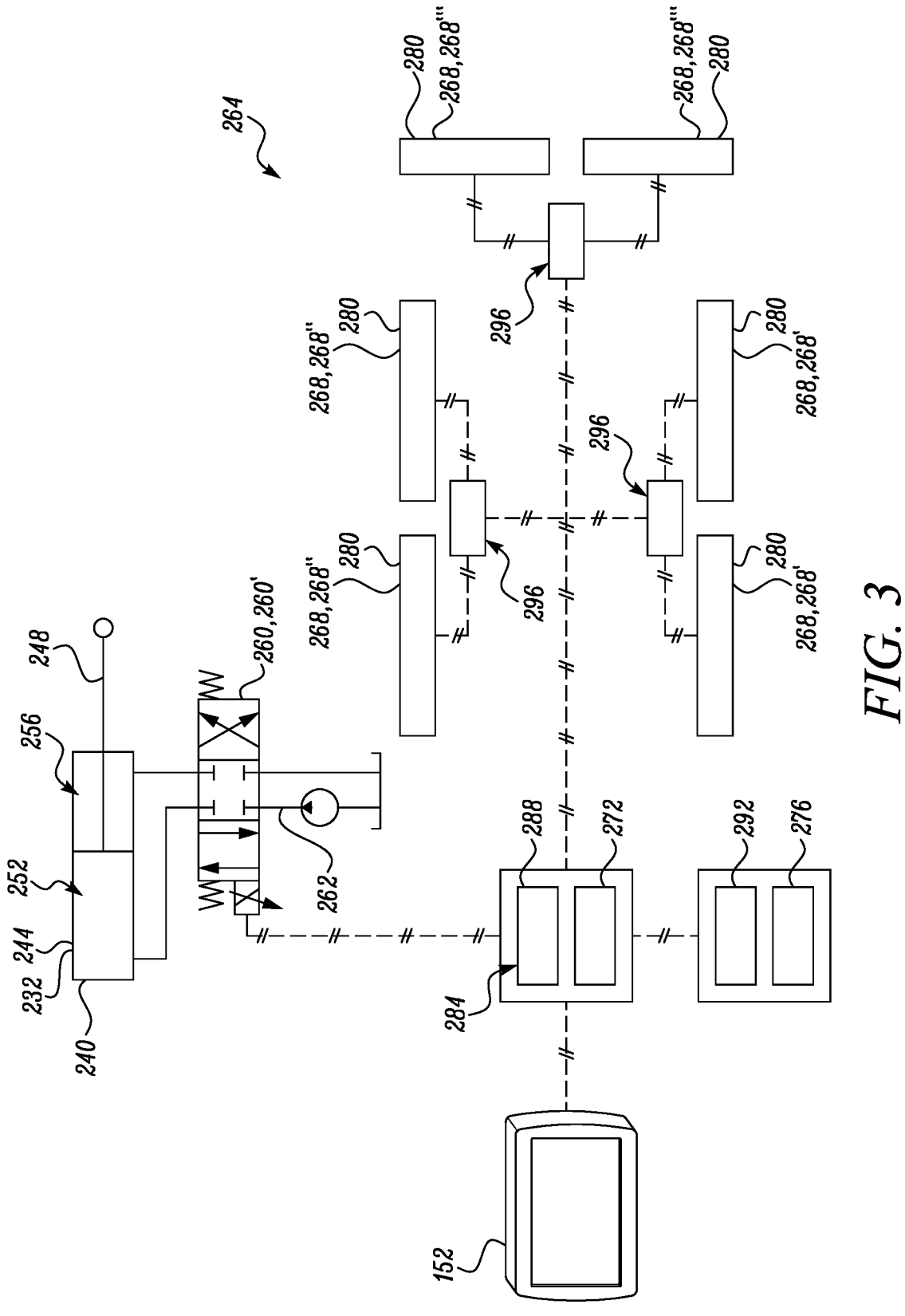
FIG. 3 is a schematic view of a weighing system to measure weight of a material in the dump body and which also includes a system for calibrating a process by which a weight of a material in the dump body is computed, in accordance with an embodiment of the present disclosure.

Referring to FIGS. 1, 2, and 3, the actuator 232 may be of a type that may be moved between an extended state and a retracted state. In this regard, the actuator 232 may include a fluid actuator 240 having a cylinder 244 and a rod 248 extendable (and retractable) relative to the cylinder 244. The fluid actuator 240 may define a head end chamber 252 and a rod end chamber 256 (see FIG. 3). The head end chamber 252 may be suitably pressurized by an introduction of a fluid therein, e.g., from a fluid source 260 such that the rod 248 (and the actuator 232) moves to the extended state. Simultaneously, fluid may be released from the rod end chamber 256. Similarly, the rod end chamber 256 may be suitably pressurized, as well, by an introduction of a fluid therein, e.g., from a suitable fluid source (such as the fluid source 260) such that the rod 248 (and the actuator 232) moves to the retracted state. Simultaneously, fluid may be released from the head end chamber 252. In some embodiments, the fluid source 260 includes a proportional directional pressure control valve 260', as shown in FIG. 3. In some embodiments, the fluid source 260 includes a set of valves and/or pumps by which fluid flow into and out of the actuator 232 may be regulated so as to achieve the aforesaid manner of actuator working.

When the fluid actuator 240 moves to the extended state, the fluid actuator 240 may cause the rear end 188 to pivot with respect to the first engagement structure 176 and the second engagement structure 180, in turn pushing the front end 184 angularly upwards to move the dump body 104 to the hoisted position. When the fluid actuator 240 moves to the retracted state, the fluid actuator 240 may cause the rear end 188 to pivot (e.g., in reverse to the angular upward movement) with respect to the first engagement structure 176 and the second engagement structure 180, in turn causing the front end 184 to return so as to be directed towards the forward sub-frame portion 140 and move the dump body 104 to the seated position.

Further, the machine 100 may include a weighing system 264 to determine a weight of the material 108 within the dump body 104 (or within the cavity 212 of the dump body 104). The weighing system 264 includes one or more sensors 268 to detect a weight of the material 108. The weighing system 264 may also include a control unit 272 and a memory 276. The control unit 272 may be communicably coupled to the sensors 268 and may be configured to compute the weight of the material 108 based on the signals received from the sensors 268. In this regard, the control unit 272 may retrieve a set of instruction (e.g., a first set of instruction) from the memory 276 so as to execute a process for determining or computing the weight of the material 108.

Exemplarily, the sensors 268 may include three sets of sensors, e.g., a set of first sensors 268', a set of second sensors 268", and a set of third sensors 268'". The first sensors 268' may be located or mounted on the first arm 168 of the rearward sub-frame portion 144 of the frame 120, the second sensors 268" may be located or mounted on the second arm 172 of the rearward sub-frame portion 144 of the frame 120, and the third sensors 268'" may be located correspondingly within (or adjacent to) the first pin 224 and the second pin 228. The sensors 268 may be configured to detect components of the weight of the material 108 exerted through the dump body 104 correspondingly when the dump body 104 is in the seated position relative to the frame 120 (i.e., the rearward sub-frame portion 144 of the frame 120).

For example, the sensors 268 may be configured to be arranged or configured to acquire a position between the dump body 104 and the frame 120 (i.e., the rearward sub-frame portion 144 of the frame 120), and when the dump body 104 is in the seated position relative to the frame 120. More particularly, in the seated position of the dump body 104 relative to the frame 120, the underside 196 of the dump body 104 may rest atop the sensors 268 so as to exert force (i.e., weight of the material 108) on the sensors 268.

In some embodiments, the sensors 268 may be appropriately or suitably calibrated such that no (or negligible) component of a weight of the dump body 104 may be passed to and/or exerted on any of sensors 268, at any given point. Also, this may mean that, in an unladen state of the dump body 104 (i.e., a state in which the dump body 104 is in the seated position and the cavity 212 of the dump body 104 is devoid of the material 108) the sensors 268 may detect negligible or zero weight, or negligible or zero components of any weight.

In some embodiments, the sensors 268 may include strain sensors 280 and may include a load cell having a metallic pad deformable under the weight of the material 108 to exhibit a corresponding change in an inherent resistance of the metallic pad. To this end, such a metallic pad may be incorporated into a Wheatstone bridge circuit (not shown) which may facilitate indication of the metallic pad's deformation based on the corresponding change in the inherent resistance. The sensors 268 may include other sensor types to detect the weight of the material 108, and which may be now known or in the future developed. As an example, the sensors 268 make a total of six sensors. However, additional or lesser number of sensors, may be contemplated.

Referring to FIG. 3, a system 284 for calibrating the process by which the weight of the material 108 in the dump body 104 is computed or determined is described. A calibration of the process to compute the weight of the material 108 in the dump body 104 may be needed owing to several factors. For example, various parts of the machine 100, including mechanical structures, such as the dump body 104, etc., and electronic components, such as the sensors 268, etc., may undergo wear as the machine 100 operates at the worksite 112 through or across multiple work cycles. Wear may cause one or more of such parts to act or function differently than intended. The system 284, as described herein, assists with calibrating the process by which the weight of the material 108 is computed, thus improving the accuracy of the process. The system 284 may include a controller 288 and a memory 292.

The controller 288 may be communicably coupled to the sensors 268 to receive signals (e.g., values) associated with a corresponding strain sustained by the sensors 268. The controller 288 may also include one or more processors or processing units which may be communicably coupled to the memory 292. In some embodiments, the controller 288 may be communicably coupled to the sensors through a CAN bus network 296, and it may be possible for the controller 288 to receive signals from the sensors 268 through the CAN bus network 296. Given three sets of the sensors 268, three corresponding values may be exemplarily obtained by the controller 288 corresponding to the weight of the material 108 received within the cavity 212 of the dump body 104. Each of those three values may relate to a component of the weight of the material 108 in the cavity 212 of the dump body 104. Once those signals are received, the controller 288 may be configured to use those signals to calibrate the process by which the weight of the material 108 in the dump body 104 is computed.

To calibrate said process, the controller 288 may be configured to acquire first values correspondingly from the sensors 268 in an unladen state of the dump body 104. Here the expression 'unladen state' may correspond to a state of the dump body 104 in which the cavity 212 of the dump body 104 is empty or devoid of any load or material. Further, the controller 288 may be configured to activate the actuator 232 such that the actuator 232 may push the dump body 104 against the sensors 268 to simulate one or more forces exertable by one or more payloads in a laden state of the dump body 104. A push of the dump body 104 against the sensors 268 may mean exerting force on the sensors 268 against the frame 120 (or against the rearward sub-frame portion 144 of the frame 120) (see force, A, and the corresponding direction of force, A, in FIGS. 1 and 2). Here the expression 'laden state' may correspond to a state of the dump body 104 in which the cavity 212 of the dump body 104 may be occupied by a load or material (such as the material 108). Such activation may be performed by pressurizing the rod end chamber 256 of the fluid actuator 240. In both the laden state and the unladen state, the dump body 104 may be in the seated position relative to the frame 120 or to the rearward sub-frame portion 144 of the frame 120.

Further, the controller 288 may be configured to acquire second values correspondingly from the sensors 268 when the actuator 232 is activated to simulate the one or more forces. Given that the activation of the actuator 232, as noted above, pushes the sensors 268 against the frame 120 (or the rearward sub-frame portion 144 of the frame 120), the second values acquired from the sensors 268 may be different from the first values. Both the first values and the second values may correspond or relate to values correspondingly obtained or sensed by the sensors 268. Once the first values and the second values are acquired by the controller 288, the controller 288 may use the first values and the second values to calibrate the process.

As an example, to use the first values and the second values, the controller 288 may be configured to deduct the first values correspondingly from the second values to arrive at corrected values. Further, the controller 288 may be configured to obtain actual components of the one or more forces corresponding to the corrected values. Thereafter, the controller 288 may derive a linear regression equation based on the corrected values and the actual components of the one or more forces to compute the weight of the material (e.g., material 108) in the dump body 104. Other exemplary details related to such a usage of the first values and the second values is discussed and set out later in the disclosure. A variation in the use of the first values and the second values may be however contemplated for the calibration of the process, and the manner of usage of the first values and the second values, as described in the present disclosure, may be considered as exemplary.

In some embodiments, a calibration of the process may be performed at the start of each work cycle. Moreover, the calibration may be initiated by an operator of the machine 100. In this regard, the controller 288 may be configured to receive a command to initiate a calibration of the process. The command may be raised by an operator of the machine 100 by accessing the input/output device 152. Based on the command, the controller 288 may retrieve a corresponding set of instruction (e.g., a second set of instruction) from the memory 292 to execute the steps or the sequence (discussed above) and/or which are associated with the calibration of the process.

The controller 288 may be communicably coupled to the machine's electronic control module (ECM) (not shown), such as a safety module or a dynamics module, or may be configured as a stand-alone entity. Optionally, the controller 288 may be integral and be one and the same as one or more of the ECMs of the machine 100. Further, the controller 288 may be a microprocessor-based device, and/or may be envisioned as an application-specific integrated circuit, or other logic devices, which provide controller functionality, and such devices being known to those with ordinary skill in the art.

In one example, it is possible for the controller 288 to include or be representative of one or more controllers having separate or integrally configured processing units to process a variety of data (or input or commands). In some embodiments, a transmission of data between the controller 288 and various other machine controllers and/or the sensors 268, various input/output devices (e.g., the input/output device 152), operator interfaces, controls, etc., may be facilitated wirelessly or through a standardized CAN bus protocol, as discussed above. In some embodiments, the controller 288 may be able to also perform one or more functions of the control unit 272 which is associated with the weighing system 264. In some embodiments, the controller 288 may be one and the same as the control unit 272 and/or the controller 288 may be integrated with the control unit 272. In such a case, the controller 288 (and/or, in general, the system 284) may form part of the weighing system 264. In some embodiments, the controller 288 may be provided independently of the control unit 272. Further, the controller 288 may be optimally suited for accommodation within certain machine panels or portions from where the controller 288 may remain accessible for ease of use, service, calibration, and repairs.

Processing units of the controller 288, to convert and/or process various input, command, signals, and/or the like, may include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor, or any other processor.

Examples of one or more of the memory 276 and the memory 292 may include a hard disk drive (HDD), and a secure digital (SD) card. Further, one or more of the memory 276 and memory 292 may include non-volatile/volatile memory units such as a random-access memory (RAM)/a read only memory (ROM), which may include associated input and output buses. The memory 276 and the memory 292 may be configured to store various other instruction sets for various other functions of the machine 100, along with the first set of instruction and or the second set of instruction, discussed above. In some embodiments, the memory 276 and memory 292 may be configured into a single and integrated memory unit.

INDUSTRIAL APPLICABILITY

Before the start of an operation or a work cycle exemplarily involving—a receipt of the material 108 into the cavity 212 of the dump body 104; a hauling of the material 108; and a dumping of the material 108 at a dump site, an operator of the machine 100 may desire to calibrate the process by which the weight of the material 108 may be computed once the material 108 is received into the cavity 212 of the dump body 104. A calibration of the process may be needed as various parts of the machine 100 may sustain wear owing to machine damage, owing to prolonged and rigorous use of the machine 100, owing to the harshness of the terrain of the worksite 112, and/or owing to modifications made on the machine 100, as discussed above.

To initiate the calibration of the process, the operator may access the input/output device 152 to generate or raise the command. While raising the command, the operator may ensure that the cavity 212 of the dump body 104 is empty and/or devoid of any load or material (e.g., material 108), and such an empty state of the dump body 104 may be maintained throughout the time the calibration is performed. In response to the command, the controller 288 may initiate the calibration involving a calibration sequence and may retrieve a set of instruction (e.g., the second set of instruction) from the memory 292 so as to calibrate the process by which the weight of the material 108 may be computed. In this regard, it may be noted that the material 108 may be any material receivable into the cavity 212 of the dump body 104 a weight of which needs to be computed or measured once the calibration is performed and completed and/or once the work cycle is initiated or is in progress.

Figure 4:
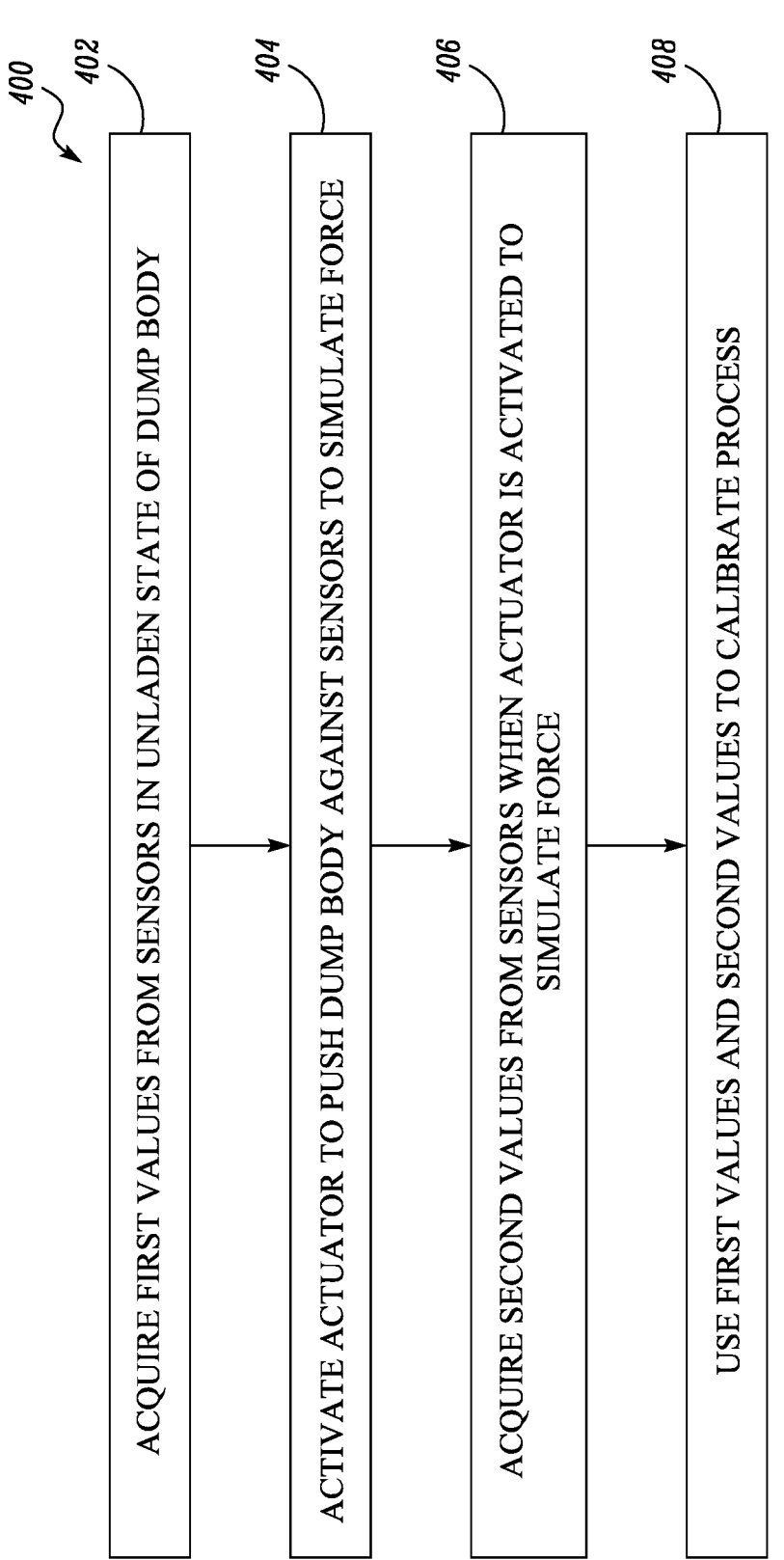
FIG. 4 is a flowchart illustrating a method for calibrating the process, in accordance with various embodiments of the present disclosure.

With reference to FIG. 4, an exemplary method for calibrating the process to compute the weight of such a material (e.g., material 108) is described. The method is described with reference to a flowchart 400 in FIG. 4 and the same (i.e., the flowchart 400) is discussed also in conjunction with FIGS. 1 to 3. The method starts at block 402.

At block 402, the controller 288 acquires first values correspondingly from the sensors 268 in the unladen state of the dump body 104. Given three sets of sensors 268, i.e., the set of first sensors 268', the set of second sensors 268", and the set of third sensors 268''', three corresponding first values may be acquired by the controller 288. The method moves to block 404.

At block 404, the controller 288 activates the actuator 232 such that the actuator 232 pushes the dump body 104 (or the underside 196 of the dump body 104) against the sensors 268 to simulate a force (e.g., force, A) exertable by a payload in a laden state of the dump body 104. As an example, an activation of the actuator 232 may include the control of the fluid source 260 (e.g., by the controller 288) or a movement or control of the proportional directional pressure control valve 260' such that fluid pressure from a pilot supply line 262 may be regulated and supplied or introduced into the rod end chamber 256 of the fluid actuator 240 to pressurize the rod end chamber 256 and accordingly generate the force (e.g., the pushing force or force, A) against the sensors 268. In some embodiments, the fluid source 260 may be part of a hydraulic circuit associated with powering the actuator 232 that helps the actuator 232 move the dump body 104 between the seated position and the hoisted position.

According to an example, the command inputted or raised by the operator may also include the aforesaid force, A (or a weight value of the payload) that is to be simulated by the activation of the actuator 232. In some cases, once the force, A, is received by the controller 288 (e.g., as or in correspondence to the command), the controller 288 may determine a corresponding fluid pressure that is to be supplied to the actuator 232 to activate the actuator 232 and by which the actuator 232 (e.g., the rod end chamber 256 of the actuator 232) is to be pressurized to achieve the simulated force (i.e., force, A). In this regard, the controller 288 may retrieve and/or obtain (e.g., from the memory 292) a value (that may be a predetermined value) of the corresponding fluid pressure from one or more look-up tables that corresponds to the force, A. It may be appreciated that the fluid pressure suppliable to the rod end chamber 256 of the actuator 232 may be directly proportional to the force, A (or the weight value of the payload).

Once the corresponding fluid pressure is tallied against the force, A, and determined by the controller 288, the controller 288 may control or manipulate the fluid source 260 (e.g., by varying an electrical signal or voltage associated with a movement or control of the proportional directional pressure control valve 260') in a commensurate measure such that the rod end chamber 256 of the actuator 232 (i.e., the fluid actuator 240) may receive or may be supplied with the corresponding fluid pressure required to match or tally the force, A, as inputted or commanded by the operator. On manipulating the fluid source 260 in the aforementioned manner, the sensors 268 may sustain the force, A, as inputted or commanded by the operator. The method proceeds to block 406.

At block 406, the controller 288 acquires second values correspondingly from the sensors 268 when the actuator 232 is activated to simulate the force, A. Given three sets of sensors 268, i.e., the set of first sensors 268', the set of second sensors 268", and the set of third sensors 268''', three corresponding second values may be acquired by the controller 288 against the force, A. The second values may be different from the first values as the second values correspond to the values obtained from the sensors 268 when the force, A, is exerted against the sensors 268, while the first values correspond to the values obtained from the sensors 268 when no force is exerted against the sensors 268. The method proceeds to block 408.

At block 408, the controller 288 uses the first values and the second values to calibrate the process by which the weight of the material 108 may be computed. The method ends at block 408.

Figure 5:
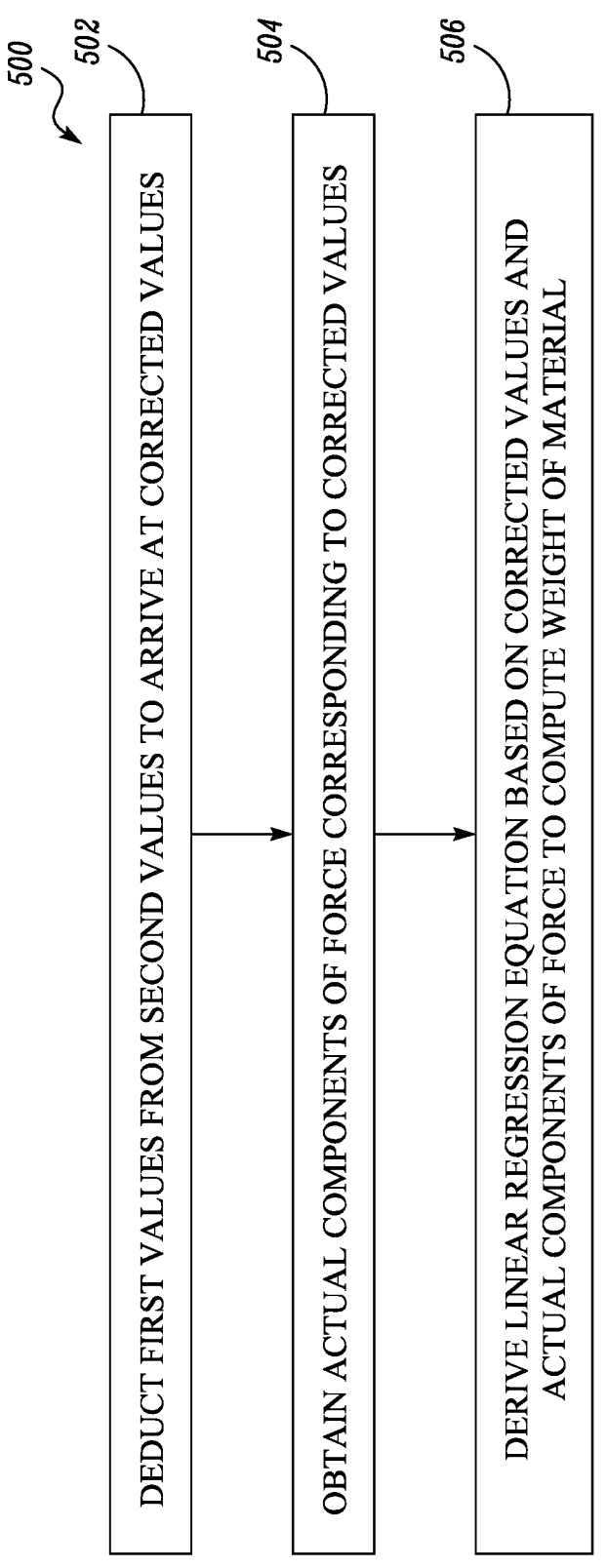
FIG. 5 is a flowchart illustrating an exemplary method by which values obtained from the flowchart of FIG. 4 are utilized to calibrate the process, in accordance with various embodiments of the present disclosure.

The manner in which the controller 288 may use the first values and the second values to calibrate the process may vary from application to application. Nevertheless, one exemplary method for using the first values and second values to calibrate the process is described by way of a flowchart 500 in FIG. 5. Said exemplary method of FIG. 5 may be a part of the calibration sequence executable by the controller 288 according to the second set of instruction, and the same may be performed by the controller 288 sequentially after the stages described from block 402 to block 406 are complete. Said exemplary method for using the first values and second values starts at block 502.

At block 502, the controller 288 deducts the first values correspondingly from the second values to arrive at corrected values. The method proceeds to block 504.

At block 504, the controller 288 obtains actual components of the force, A, corresponding to the corrected values arrived at block 502. In this regard, and given that the corrected values, as obtained, are each associated with the force, A, inputted or commanded by the operator, the controller 288, for each corrected value of the corrected values, may compute a ratio between the corresponding corrected value and a summation of all corrected values associated with the force, A. Then, the controller 288 may calculate a product of the ratio with the force, A, so as to arrive at or obtain the actual components of the force, A. The method proceeds to block 506.

At block 506, the controller 288 derives a linear regression equation based on the corrected values and the actual components of the force, A, to help compute the weight of the material 108 receivable in the dump body 104 once the calibration is complete. To derive the linear regression equation to compute the weight of the material 108, the controller 288 may use an equation (1) having the equation format:

$$w = a + bx,$$

with said equation being applicable for each corrected value of the corrected values, and where for each corrected value:

$w$ = an estimated component of the force, $A$, based on the linear regression equation;

$x$ = the corresponding corrected value;

$$a = \left[\left(\sum y\right)\left(\sum x^2\right) - \left(\sum x\right)\left(\sum xy\right)\right] / \left[n\left(\sum x^2\right) - \left(\sum x\right)^2\right]; \quad \text{equation (2)}$$

$$b = \left[n\left(\sum xy\right) - \left(\sum x\right)\left(\sum y\right)\right] / \left[n\left(\sum x^2\right) - \left(\sum x\right)^2\right]; \quad \text{equation (3)}$$

where 'n' is the total number of data points or sensor readings corresponding to the force, A, which in this exemplary case may be three given there are three first values or three second values; and y=an actual component of the force, A, associated with the corresponding corrected value.

The stages described in block 402 to block 504 (or block 506) may relate to a single instance in which corrected values corresponding to a single force (i.e., force, A) are obtained. It is possible that an operator repeats the stages described in block 402 to block 504 (or block 506) for one or more additional forces, and therefore multiple such instances may be accomplished during the calibration of the process. When calibrating using multiple forces and when the instances relate to the stages from block 402 to block 506, the linear regression equation may be updated (and further refined) consecutively at the end of every instance.

Conversely, when the instances relate to the stages from block 402 to 504, the linear regression equation may be updated just once for multiple instances. As an example, multiple instances may correspond to multiple corrected values (i.e., more than three corrected values) and correspondingly there may be multiple actual components of the corresponding forces as may be commanded by the operator in the corresponding instances. In such a case, the value of 'n' in equation (2) and equation (3) may change and may equal a total number of corrected values or the total number of actual components in the instances. In some embodiments, more the instances, better may be the calibration and more accurate may be the linear regression equation.

Once the linear regression equation has been derived and/or updated and the calibration is performed or completed, a material (e.g., material 108) may be received into the cavity 212 of the dump body 104 and its weight may be computed by the control unit 272 using the data (e.g., third values) from the sensors 268. The computation may include summating components of the weight of the material (e.g., material 108) corresponding to each corrected value arrived at from the third values. The method for using the first values and second values ends at block 506.

Description further below includes illustration of an exemplary working example associated with the calibration sequence. Said exemplary working example is discussed in conjunction with the flowchart 400 of FIG. 4 and the flowchart 500 of FIG. 5. The values iterated in the exemplary working example are provided for illustrative and exemplary purposes alone, and may include other values. For the exemplary working example, it will be assumed that the calibration includes two instances and the linear regression equation is derived just once at the end of those two instances. As part of a first instance, force, A, simulated by the actuator 232 (or the fluid actuator 240), exertable against the sensors 268, may be equivalent to 58550 kilograms (kg). As part of a second instance, force, A (or a force, A'), simulated by the actuator 232 (or the fluid actuator 240), exertable against the sensors 268, may be equivalent to 47850 kg.

As the controller 288 receives the command from the operator to calibrate the process of computing a weight of a material, the controller 288 may acquire exemplary first values from the sensors 268 in an unladen state of the dump body 104, as presented below in Table 1.

TABLE 1

| Sensor | First values |
|---|---|
| First sensors | 723 |
| Second sensors | 742 |
| Third sensors | 326 |

Next, the controller 288 may acquire exemplary second values from the sensors 268 in a laden state of the dump body 104 as presented below in Table 2. Said exemplary second values from the sensors 268 may be obtained by activating the actuator 232.

TABLE 2

| Sensor | Second values |
|---|---|
| First sensors | 2178 |
| Second sensors | 2121 |
| Third sensors | 2239 |

Having acquired both the first values and the second values, the controller 288 may then deduct the first values from the second values and may arrive at exemplary corrected values, as presented below in Table 3.

TABLE 3

| Sensor | First values | Second Values | Corrected Values (x) |
|---|---|---|---|
| First sensors | 723 | 2178 | 1455 |
| Second sensors | 742 | 2121 | 1379 |
| Third sensors | 326 | 2239 | 1913 |

Thereafter, the controller 288 may obtain actual components of the force, A, (i.e., equivalent to 58550 kg) corresponding to the corrected values. In this regard, it may be noted that each corrected value, i.e., 1455, 1379, and 1913, is associated with the force, A, (i.e., equivalent to 58550 kg). To obtain actual components of the force, A, corresponding to the corrected values, the controller 288 is configured to compute a ratio between the corresponding corrected value and a summation of all corrected values associated with the corresponding force, i.e., force, A. As an example, the component of the force, A, corresponding to the corrected value of 1455 equals 17946, which is obtained by the controller 288 by way of obtaining the following ratio: [1455/(1455+1379+1913)=0.306509] and then by calculating a product of said ratio with the force, A, (i.e., 0.306509*58550=17946). In that manner, the controller 288 may arrive at the following exemplary actual components of the force, A, as presented below in Table 4.

TABLE 4

| S. no. | Sensor | Corrected Values (x) | Actual Components (y) |
|---|---|---|---|
| 1 | First sensors | 1455 | 17946 |
| 2 | Second sensors | 1379 | 17009 |
| 3 | Third sensors | 1913 | 23595 |

Once the actual components are obtained, the controller 288 may repeat the stages of the aforementioned example for one or more other forces based on an operator request. As an example, the controller 288 may repeat the stages of the aforementioned example for one other force, A', which may be equivalent to 47850 kg. Corresponding to said other force, A', the controller 288 may arrive at the following exemplary actual components of said other force, A', as presented below in Table 5.

TABLE 5

| S. no. | Sensor | Corrected Values (x) | Actual Components (y) |
|---|---|---|---|
| 4 | First sensors | 1347 | 15895 |
| 5 | Second sensors | 1229 | 14503 |
| 6 | Third sensors | 1479 | 17453 |

Once such data is obtained, the controller 288 derives a linear regression equation based on the corrected values and the actual components of the forces, A and A', (i.e., forces equivalent to 58550 kg and 47850 kg). The corrected values and the corresponding actual components for the two forces, A and A', are exemplarily provided below in Table 6 in a consolidated format, along with additionally derived quantities indicated by, $(x)*(y)$ and $(x)^2$:

TABLE 6

| S. no. | (x) | (y) | (x)*(y) | $(x)^2$ |
|---|---|---|---|---|
| 1 | 1455 | 17946 | 26111610 | 2117025 |
| 2 | 1379 | 17009 | 234550041 | 1901641 |
| 3 | 1913 | 23595 | 45137511 | 3659569 |
| 4 | 1347 | 15895 | 21410474 | 1814409 |
| 5 | 1229 | 14503 | 17823576 | 1510441 |
| 6 | 1479 | 17453 | 25812343 | 2187441 |
| Σ | 8802 | 106400 | 159750556 | 13190526 |

The linear regression equation is based on the format w=a+bx, as noted above. The value of 'a' is calculated according to equation (2) and the value of 'b' is calculated according to equation (3), and the following values of 'a' and 'b' are accordingly obtained:

a=−1590 and b=13.17

Therefore, the linear regression equation as derived by the controller 288 becomes: w=−1590+13.17x. At this point, i.e., once the linear regression equation has been derived by the controller 288, the controller 288 may complete or halt the calibration steps or sequence.

In some embodiments, the controller 288 may use the linear regression equation to compute the value of 'w' corresponding to each corrected value and determine the percentage difference between the values of 'y' and values of 'w', as exemplary observed from Table 7 below:

TABLE 7

| S. no. | (x) | (y) | (w) | % Difference |
| --- | --- | --- | --- | --- |
| 1 | 1455 | 17946 | 17575 | −2.067 |
| 2 | 1379 | 17009 | 16574 | −2.555 |
| 3 | 1913 | 23595 | 23608 | 0.055 |
| 4 | 1347 | 15895 | 16153 | 1.622 |
| 5 | 1229 | 14503 | 14598 | 0.661 |
| 6 | 1479 | 17453 | 17891 | 2.514 |

At this point, the controller 288 may provide the percentage difference between the values of 'y' and 'w' and may provide said percentage difference to the operator (e.g., through the input/output device 152). In some embodiments, if the controller 288 determines that the percentage difference between the values of 'y' and 'w' are greater than a threshold percentage difference, the controller 288 may issue a notification (e.g., through the input/output device 152) to the operator to perform the calibration for additional forces so as to further refine the linear regression equation. Also, it may be noted that the values of 'a' and 'b' may change if the stages described in block 402 to block 504 (or block 506) are repeated for one or more additional forces.

After calibrating the process, the material 108 may be received into the cavity 212 (e.g., an empty cavity) of the dump body 104 and the weight of the material 108 in the dump body 104 may then be computed. In this regard, the derived linear regression equation may then be used to compute the weight of the material 108 received into the dump body 104 as part of the calibrated process. According to an exemplary manner of using the calibrated process to compute the weight of the material 108, third values corresponding to the weight of the material 108 may be acquired (e.g., by the control unit 272 and/or by the controller 288) from the sensors 268, corrected values corresponding to the weight may then be correspondingly obtained (e.g., by the control unit 272 and/or by the controller 288) by deducting the first values from the third values, and components (e.g., 'w') of the weight based on the linear regression equation (i.e., w=a+bx) may be then estimated (e.g., by the control unit 272 and/or by the controller 288) in correspondence to the corrected values. Once the components of the weight are estimated in correspondence to the corrected values, said components of the weight may be summated (e.g., by the control unit 272) to compute the weight of the material 108.

With the system 284, personnel such as machine operators and/or site supervisors can easily calibrate the process (including updating or further refining the linear regression equation) by which a weight of a material (e.g., material 108) may be computed with minimal or negligible error. Further, with the actuator 232 being used to push the dump body 104 against the sensors 268 (which may be strain sensors 280) to simulate one or more forces (e.g., forces, A and A′) exertable by one or more payloads in a laden state of the dump body 104, the system 284 saves time especially by negating the need to place loads (e.g., physical calibrated weighing blocks) into the cavity 212 of the dump body 104 so as to obtain a force (or forces) according to which the process may be calibrated. In some cases, the system 284 may be applicable to several other sequences of calibrating the process to compute the weight of material 108, and, therefore, the calibration sequence (e.g., from block 502 to block 506), as described here, may differ from what has been disclosed and said sequence of the calibration, discussed in the present disclosure, may be viewed as exemplary. The system 284 offers a relatively easy, time efficient, and space efficient mechanism, to calibrate the process to compute a weight of a material (e.g., material 108) and which may be used regularly, e.g., at every start of a work cycle or a work shift, without sustaining any substantial loss in worksite productivity and/or man hours.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A method for calibrating a process by which a weight of a material in a dump body of a machine is computed, the method comprising:

acquiring, by a controller, first values correspondingly from one or more strain sensors in an unladen state of the dump body;

activating, by the controller, an actuator to push the dump body against the one or more strain sensors to simulate one or more forces exertable by one or more payloads in a laden state of the dump body;

acquiring, by the controller, second values correspondingly from the one or more strain sensors when the actuator is activated to simulate the one or more forces; and using, by the controller, the first values and the second values to calibrate the process, wherein using the first values and the second values to calibrate the process includes:

deducting, by the controller, the first values correspondingly from the second values to arrive at corrected values;

obtaining, by the controller, actual components of the one or more forces corresponding to the corrected values; and deriving, by the controller, a linear regression equation based on the corrected values and the actual components of the one or more forces by which the weight of the material in the dump body is computed.

2. The method of claim 1, wherein the actuator is a fluid actuator and is configured to move the dump body between a seated position and a hoisted position relative to a frame of the machine, the one or more strain sensors acquiring positions between the dump body and the frame when the dump body is in the seated position relative to the frame.

3. The method of claim 2, wherein activating the actuator includes:

receiving, by the controller, a command corresponding to the one or more forces; and determining, by the controller, one or more corresponding fluid pressures for supply to the fluid actuator in correspondence to the one or more forces.

4. The method of claim 3, wherein activating the actuator includes:

controlling, by the controller, a fluid source to supply the one or more corresponding fluid pressures to the fluid actuator.

5. The method of claim 1, wherein each corrected value of the corrected values is associated with a corresponding force of the one or more forces, and obtaining actual components of the corresponding force corresponding to the corrected values include:

for each corrected value, deducing, by the controller, a ratio between the corresponding corrected value and a summation of all corrected values associated with the corresponding force; and calculating, by the controller, a product of the ratio with the corresponding force.

6. The method of claim 1, wherein deriving the linear regression equation to compute the weight of the material includes using, by the controller, an equation format: w=a+bx for each corrected value of the corrected values, wherein, for each corrected value:

$w = $ an estimated component of a corresponding force of the one or more forces based on the linear regression equation;

$x = $ the corresponding corrected value;

$$a = \left[\left(\sum y\right)\left(\sum x^2\right) - \left(\sum x\right)\left(\sum xy\right)\right] / \left[n\left(\sum x^2\right) - \left(\sum x\right)^2\right];$$

$$b = \left[n\left(\sum xy\right) - \left(\sum x\right)\left(\sum y\right)\right] / \left[n\left(\sum x^2\right) - \left(\sum x\right)^2\right]; \text{ and}$$

$y = $ an actual component of the corresponding force associated with the corresponding corrected value.

7. A system for calibrating a process, the system comprising:

a memory for storing one or more sets of instruction; and a controller communicably coupled to the memory and configured to execute the one or more sets of instruction to:

acquire first values correspondingly from one or more strain sensors in an unladen state of a dump body of a machine;

activate an actuator to push the dump body against the one or more strain sensors to simulate one or more forces exertable by one or more payloads in a laden state of the dump body;

acquire second values correspondingly from the one or more strain sensors when the actuator is activated to simulate the one or more forces; and use the first values and the second values to calibrate the process, wherein to use the first values and the second values to calibrate the process, the controller is configured to:

determine corrected values based on the first values and the second values;

obtain actual components of the one or more forces corresponding to the corrected values; and derive an equation based on the corrected values and the actual components of the one or more forces by which a weight of a material in a dump body is computed.

8. The system of claim 7, wherein the actuator is a fluid actuator and is configured to move the dump body between a seated position and a hoisted position relative to a frame of the machine, the one or more strain sensors acquiring positions between the dump body and the frame when the dump body is in the seated position relative to the frame.

9. The system of claim 8, wherein to activate the actuator, the controller is configured to:

receive a command corresponding to the one or more forces; and determine one or more corresponding fluid pressures for supply to the fluid actuator in correspondence to the one or more forces.

10. The system of claim 9, wherein to activate the actuator, the controller is configured to control a fluid source to supply the one or more corresponding fluid pressures to the fluid actuator.

11. The system of claim 7, wherein each corrected value of the corrected values is associated with a corresponding force of the one or more forces, and to obtain actual components of the corresponding force corresponding to the corrected values, the controller is configured to:

for each corrected value, deduce a ratio between the corresponding corrected value and a summation of all corrected values associated with the corresponding force; and calculate a product of the ratio with the corresponding force.

12. The system of claim 7, wherein to derive the equation to compute the weight of the material, the controller is configured to:

use an equation format: w=a+bx for each corrected value of the corrected values, wherein, for each corrected value:

$w = $ an estimated component of a corresponding force of the one or more forces based on the equation;

$$a = \left[\left(\sum y\right)\left(\sum x^2\right) - \left(\sum x\right)\left(\sum xy\right)\right] / \left[n\left(\sum x^2\right) - \left(\sum x\right)^2\right];$$

$$b = \left[n\left(\sum xy\right) - \left(\sum x\right)\left(\sum y\right)\right] / \left[n\left(\sum x^2\right) - \left(\sum x\right)^2\right]; \text{ and}$$

$y = $ an actual component of the corresponding force associated with the corresponding corrected value.

13. A machine, comprising:

a frame;

a dump body configured to receive a material;

an actuator coupled between the frame and the dump body;

one or more strain sensors configured to acquire positions between the dump body and the frame to detect a weight of the material; and a system for calibrating a process by which the weight of the material in the dump body is computed, the system including:

a memory for storing one or more sets of instruction; and a controller communicably coupled to the one or more strain sensors and to the memory, the controller configured to execute the one or more sets of instruction to:

acquire first values correspondingly from the one or more strain sensors in an unladen state of the dump body;

activate the actuator to push the dump body against the one or more strain sensors to simulate one or more forces exertable by one or more payloads in a laden state of the dump body;

acquire second values correspondingly from the one or more strain sensors when the actuator is activated to simulate the one or more forces; and use the first values and the second values to calibrate the process, wherein to use the first values and the second values to calibrate the process, the controller is configured to:

determine, based on the first values and the second values, corrected values;

obtain actual components of the one or more forces corresponding; and derive an equation based on the corrected values and the actual components of the one or more forces by which the weight of the material in the dump body is computed.

14. The machine of claim 13, wherein the actuator is a fluid actuator and is configured to move the dump body between a seated position and a hoisted position relative to the frame, the one or more strain sensors acquiring positions between the dump body and the frame when the dump body is in the seated position relative to the frame.

15. The machine of claim 14, wherein to activate the actuator, the controller is configured to:

receive a command corresponding to the one or more forces;

determine one or more corresponding fluid pressures for supply to the fluid actuator in correspondence to the one or more forces; and control a fluid source to supply the one or more corresponding fluid pressures to the fluid actuator.

16. The machine of claim 13, wherein each corrected value of the corrected values is associated with a corresponding force of the one or more forces, and to obtain actual components of the corresponding force corresponding to the corrected values, the controller is configured to:

for each corrected value, deduce a ratio between the corresponding corrected value and a summation of all corrected values associated with the corresponding force; and calculate a product of the ratio with the corresponding force.

17. The machine of claim 13, wherein to derive the equation to compute the weight of the material, the controller is configured to:

use an equation format: w=a+bx for each corrected value of the corrected values, wherein, for each corrected value:

$w$ = an estimated component of a corresponding force of the one or more forces based on the equation;

$$a = \left[\left(\sum y\right)\left(\sum x^2\right) - \left(\sum x\right)\left(\sum xy\right)\right] / \left[n\left(\sum x^2\right) - \left(\sum x\right)^2\right];$$

$$b = \left[n\left(\sum xy\right) - \left(\sum x\right)\left(\sum y\right)\right] / \left[n\left(\sum x^2\right) - \left(\sum x\right)^2\right]; \text{ and}$$

$y$ = an actual component of the corresponding force associated with the corresponding corrected value.

18. The machine of claim 13, wherein the equation is a linear regression equation.

19. The machine of claim 13, wherein the corrected values are based on a difference between the first values and the second values.

20. The machine of claim 13, wherein the controller is further configured to:

pressurize, based on the equation, the actuator to generate a particular force against the one or more strain sensors.

\*   \*   \*   \*   \*